United States Patent
Nicula et al.

(10) Patent No.: US 11,021,021 B1
(45) Date of Patent: Jun. 1, 2021

(54) RFID TAG SECURED TO A TIRE

(71) Applicant: The Goodyear Tire & Rubber Company, Akron, OH (US)

(72) Inventors: Adrian Florin Nicula, Luxembourg (LU); Andreas Frantzen, Trier (DE); Christian Jean-Marie Kaes, Schrondweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/107,989

(22) Filed: Dec. 1, 2020

(51) Int. Cl.
| | | |
|---|---|---|
| *B60C 19/00* | (2006.01) | |
| *B32B 27/08* | (2006.01) | |
| *B32B 7/12* | (2006.01) | |
| *B32B 27/36* | (2006.01) | |
| *B32B 27/34* | (2006.01) | |

(52) U.S. Cl.
CPC ............... *B60C 19/00* (2013.01); *B32B 7/12* (2013.01); *B32B 27/08* (2013.01); *B32B 27/34* (2013.01); *B32B 27/36* (2013.01); *B32B 2519/02* (2013.01); *B60C 2019/004* (2013.01)

(58) Field of Classification Search
CPC ... B60C 19/00; B60C 2019/004; B32B 27/08; B32B 7/12; B32B 27/36; B32B 27/34; B32B 2519/02
See application file for complete search history.

(56) References Cited

U.S. PATENT DOCUMENTS

| | | |
|---|---|---|
| 6,546,982 B1 | 4/2003 | Brown et al. |
| 6,885,291 B1 | 4/2005 | Pollack et al. |
| 6,899,153 B1 | 5/2005 | Pollack et al. |
| 6,978,669 B2 | 12/2005 | Lionetti et al. |
| 7,108,761 B2 | 9/2006 | Bell |
| 7,598,877 B2 | 10/2009 | Lionetti |
| 7,658,809 B2 | 2/2010 | Bell |
| 7,832,263 B2 | 11/2010 | Rensel et al. |
| 7,900,666 B2 | 3/2011 | Bell |
| 8,115,610 B2 | 2/2012 | Lionetti et al. |
| 8,157,172 B2 | 4/2012 | Fenkanyn |
| 8,430,142 B2 | 4/2013 | Incavo et al. |
| 8,657,975 B2 | 2/2014 | Bell |
| 9,183,423 B2 | 11/2015 | Batcho, Sr. et al. |
| 10,137,741 B2 | 11/2018 | Ferry et al. |
| 10,457,005 B2 | 10/2019 | Keenan et al. |
| 10,621,485 B2 | 4/2020 | Uijlenbroek et al. |
| 2005/0059308 A1 | 3/2005 | Parsons |
| 2005/0221704 A1 | 10/2005 | Conwell et al. |
| 2007/0158436 A1 | 7/2007 | Ichikawa et al. |
| 2010/0032066 A1 | 2/2010 | Nakao et al. |
| 2017/0001480 A1 | 1/2017 | Ferry et al. |
| 2017/0277992 A1 | 9/2017 | Janko et al. |

FOREIGN PATENT DOCUMENTS

WO    2020097340 A1    5/2020

*Primary Examiner* — Michael C Miggins
(74) *Attorney, Agent, or Firm* — Robert N. Lipcsik

(57) ABSTRACT

An RFID tag for attaching to a tire consists of a first polyester layer, a second polyester layer adjacent the first polyester layer, the second polyester layer having an etched antenna and an RFID chip, and a third polyester layer adjacent the second polyester layer. The third polyester layer surrounds part of the first and second layers and is secured by heat to an innerliner of the tire.

13 Claims, 2 Drawing Sheets

RFID TAG SECURED TO A TIRE

FIELD OF THE INVENTION

The present invention relates to RFID tags secured to rubber-based articles (e.g., cured tires, green tires, etc.) and, more particularly, to RFID tags attached to an internal surface (e.g., innerliner, ply, etc.) of a tire.

BACKGROUND OF THE INVENTION

Articles of manufacture may commonly be monitored during manufacture and thereafter for inventory control purposes. One conventional practice may be to apply an RFID tag label to an article containing an identifier and/or other information associated with the article of manufacture.

Regarding tire manufacturing, to which the present invention may find particular application, identifying tires and other rubber-based articles may be problematic, particularly if the identification is to occur prior to fabrication and/or prior to completion of production. Tires and a wide array of other rubber-based articles may be subjected to one or more vulcanization processes in which the tire and/or tire components may be fused, molded, and/or cured together. Vulcanization typically modifies an uncured rubber-based composition by forming an extensive network of molecular crosslinks within the rubber matrix, thereby significantly increasing the strength and durability of the rubber-based article. Although numerous vulcanization techniques are known having various different curing methods, all, or nearly all, vulcanization techniques may include the application of elevated pressures and elevated temperatures to the "green" (e.g., uncured, non-vulcanized, non-cross-linked, etc.) rubber-based articles.

In view of these process conditions, adhesive-based RFID tags have been developed that may be applied to green rubber-based articles such as tires, and which may endure the relatively high temperatures and pressures associated with vulcanization. While generally satisfactory in many respects, adhesive RFID tags may not endure the lifetime of the article and may detach from the article due to the various types of stresses on the article both during and after production.

Potential detachment of an RFID tag may be caused by tag stiffness and the inability to handle the relative flexibility of rubber during multiple stages of the tire-build process and when the tire is fitted on a rim. This detachment may initially begin during the vulcanization process while the mold is moving and continue right after curing when the tire temperature still elevated.

If the tire is released from the mold and moves (e.g., flexes), the RFID tag may fall off immediately or, at the least, the adhesion may be weakened as a result of the movement. Additionally, during the process of fitting the tire on a rim, the tire (particularly the bead area) may be subjected to significant mechanical stress by the fitting machines. When tires are in use, the various road and driving stresses may cause the RFID tag to detach from the tire.

Within the tire industry, RFID tag suppliers may concentrate on the development of better adhesives. Conversely, tire and rubber product producers may experiment with positioning of the RFID tag by applying the RFID tag in the so-called "non-flexing-zones" of the tire or rubber product. While these activities may reduce detachment to some degree, these activities may not be ultimate solutions. Additionally, the addition of RFID chips to current solutions may contribute to detachment, and locating current RFID tags behind the metal rim post-fitting may impede the ability to read the RFID chip from a useful distance. Accordingly, an alternative to an adhesive-based RFID tag capable of remaining attached and operable to a rubber-based article during article production (e.g., vulcanization), distribution, inventory, and article lifetime may be useful.

SUMMARY OF THE INVENTION

An RFID tag for attaching to a tire in accordance with the present invention consists of a first polyester layer, a second polyester layer adjacent the first polyester layer, the second polyester layer having an etched antenna and an RFID chip, and a third polyester layer adjacent the second polyester layer. The third polyester layer surrounds part of the first and second layers and is secured by heat to an innerliner of the tire.

According to another aspect of the RFID tag, the second polyester layer includes a radially outermost topcoat sublayer.

According to still another aspect of the RFID tag, the second polyester layer includes a radially inner first polyester sublayer with a thermal printed barcode image.

According to yet another aspect of the RFID tag, the second polyester layer is corona tested on both sides.

According to still another aspect of the RFID tag, the second polyester layer includes a radially inner first high temperature adhesive sublayer.

According to yet another aspect of the RFID tag, the second polyester layer includes a radially inner polyamide sublayer with an etched antenna and an integrated circuit.

According to still another aspect of the RFID tag, the second polyester layer includes a radially inner second high temperature adhesive sublayer.

According to yet another aspect of the RFID tag, the second polyester layer includes a radially inner first adhesion promoter sublayer.

According to still another aspect of the RFID tag, the second polyester layer includes a radially inner second polyester sublayer.

According to yet another aspect of the RFID tag, the second polyester layer includes a radially inner second adhesion promoter sublayer.

According to still another aspect of the RFID tag, the second polyester layer includes a radially inner uncured rubber-based third adhesive sublayer.

A tire in accordance with the present invention includes an RFID tag for attaching to the tire. The RFID tag consists of a first polyester layer, a second polyester layer adjacent the first polyester layer, the second polyester layer having an etched antenna and an RFID chip, and a third polyester layer adjacent the second polyester layer, the third polyester layer surrounding part of the first and second layers and being secured by heat to an innerliner of the tire.

According to another aspect of the tire, the second polyester layer includes an ultra-high molecular weight polyethylene (UHMWPE).

Definitions

As used herein and in the claims:

"Axial" and "axially" refer to lines or directions that are parallel to the axis of rotation of the tire.

"Belt structure" means at least two annular layers or plies of parallel cords, woven or unwoven, underlying the tread, unanchored to the bead, and having cords inclined respect to the equatorial plane (EP) of the tire. The belt structure may also include plies of parallel cords inclined at relatively low angles, acting as restricting layers.

"Breakers" means at least two annular layers or plies of parallel reinforcement cords having the same angle with reference to the equatorial plane (EP) of the tire as the parallel reinforcing cords in carcass plies. Breakers are usually associated with bias tires.

"Carcass" means the tire structure apart from the belt structure, tread, undertread, and sidewall rubber over the plies, but including the beads.

"Casing" means the carcass, belt structure, beads, sidewalls, and all other components of the tire excepting the tread and undertread, i.e., the whole tire.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Composite", as used herein, means constructed from two or more layers.

"Cut belt ply" refers to a belt having a width less than the tread width, which lies flat over the carcass plies in the crown area of the tire.

"Crown" means that portion of the tire in the proximity of the tire tread.

"Dynamic shear modulus" means the shear modulus measured per ASTM D5992.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Hysteresis" means a dynamic loss tangent (e.g., max tan delta). The dynamic characteristics of the materials are measured on an MTS 831 Elastomer Test System in accordance with ASTM D5992. The response of a sample of vulcanized material (cylindrical test piece of a thickness of 4 mm and a section of 400 mm$^2$), subjected to an alternating single sinusoidal shearing stress, at a frequency of 10 Hz and at 80° C., is recorded. Scanning is conducted at an amplitude of deformation of 0.1 percent to 50 percent (outward cycle), then of 50 percent to 0.1 percent (return cycle). The maximum shear modulus G max in MPa and the maximum value of the tangent of the loss angle tan delta (max tan delta) is determined during the outward cycle.

"Inner" means toward the inside of the tire and "outer" means toward its exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"Lateral" means an axial direction.

"Meridian plane" means a plane parallel to the axis of rotation of the tire and extending radially outward from the axis.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal load" means the specific design inflation pressure and load assigned by the appropriate standards organization for the service condition for the tire.

"Outboard side" means the side of the tire farthest away from the vehicle when the tire is mounted on a wheel and the wheel is mounted on the vehicle.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane (EP) of the tire.

"Radial ply tire" means a belted or circumferentially-restricted pneumatic tire in which at least one ply has cords which extend from bead to bead and the ply is laid at cord angles between 65° and 90° with respect to the equatorial plane (EP) of the tire.

"Section height" means the radial distance from the nominal rim diameter to the outer diameter of the tire at its equatorial plane (EP).

"Section width" means the maximum linear distance parallel to the axis of the tire and between the exterior of its sidewalls when and after it has been inflated at normal pressure for 24 hours, but unloaded, excluding elevations of the sidewalls due to labeling, decoration, or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Spring rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Tenacity" means stress expressed as force per unit linear density of the unstrained specimen (gm/tex or gm/denier).

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Vertical deflection" means the amount that a tire deflects under load.

"Wheel" or "hub" means a structure for supporting the tire and mounting to the vehicle axle.

BRIEF DESCRIPTION OF THE DRAWINGS

The present invention will be described by way of example and with reference to the accompanying drawings, in which.

DETAILED DESCRIPTION OF EXAMPLES OF THE PRESENT INVENTION

Figure 1:
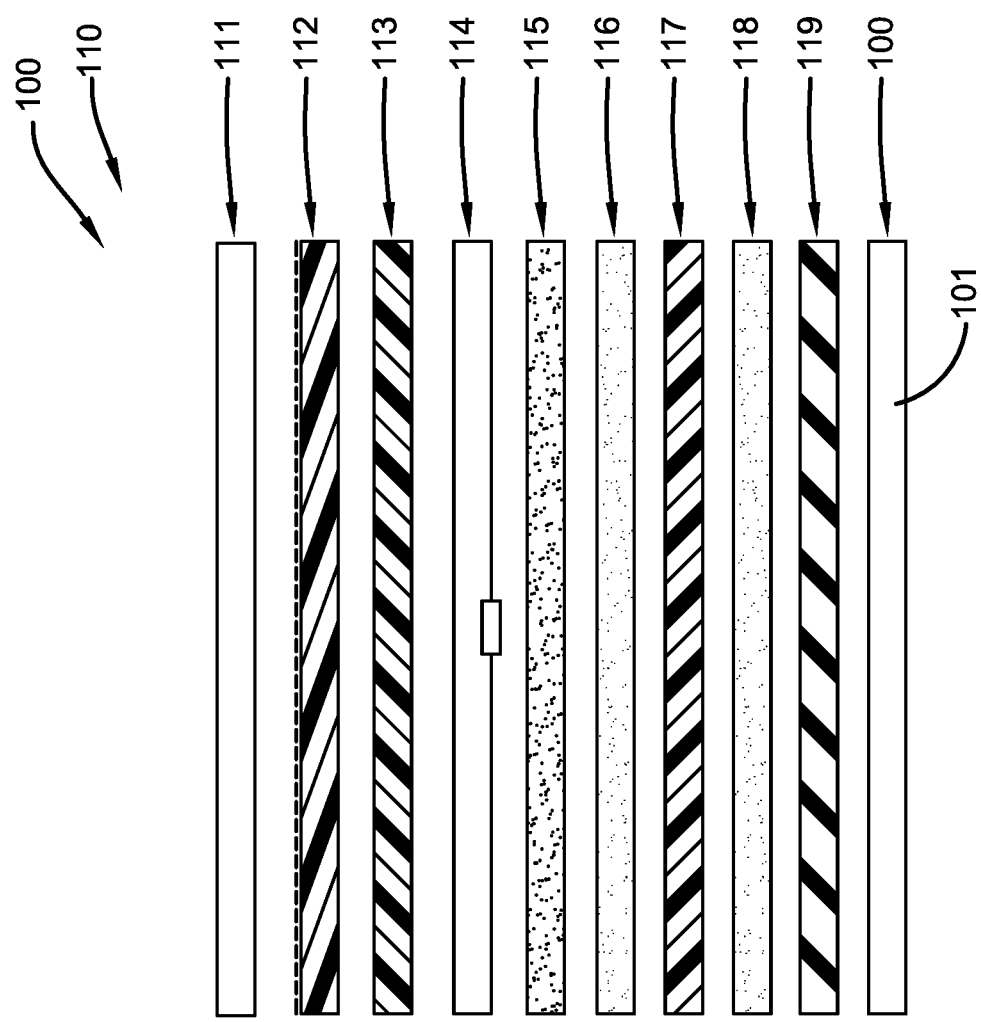
FIG. 1 is a schematic depiction of an example RFID tag for use with the present invention.

The present invention will now be described more fully hereinafter with reference to the accompanying drawings in which examples of the present invention are shown. However, the present invention may be embodied in many different forms and should not be construed as limited to the representative examples set forth herein. The examples are provided so that this disclosure will be both thorough and complete, and will fully convey the scope of the present invention and enable one of ordinary skill in the art to make, use, and/or practice the present invention. Like reference numbers refer to like elements throughout the various drawings.

RFID tags may enable various tire tracking solutions for articles of manufacture that include electronic identification provisions such as, for example, RFID devices incorporated in/onto a substrate such as a mesh backing/material such that the tags may be configured to withstand pressures, temperatures, and/or stresses associated with manufacturing (e.g., tire vulcanization) and a wide variety of uses of tires and other rubber products while concurrently maintaining operability during these processes, after these processes, and throughout the lifetime of the article thereby sensing and providing unique identifier(s) and/or other information about the article during distribution, inventory, and article life. As disclosed further below, the RFID tag may be affixed to, and/or incorporated on, a sidewall, a bead, and/or an innerliner of a wide array of tires. Depending on the type of tire, the material of the tire, and/or the use of the tire (e.g. racing tires), the thickness, surface area, and/or configuration of the different RFID tag materials may vary.

As will be appreciated, tires may typically be used in combination with rims of a vehicle. The rubber-based tire may support, and provide grip for, the vehicle with a road or ground surface. The RFID tag may be used with bias tires, belted bias tires, radial tires, solid tires, semi-pneumatic tires, pneumatic tires, airless tires, non-pneumatic tires, truck/bus tires, airplane tires, agriculture tires, racing tires, etc.

An RFID tag may withstand conditions typically associated with vulcanization processes without degradation. The term vulcanization as used herein may generally refer to heating to a temperature greater than 90° C., and up to 200° C., for a predetermined time period, for example, from at least 10 minutes to as much as several hours. The RFID tag generally may include at least one RFID device.

The RFID device generally includes an antenna for wirelessly transmitting and/or receiving RF signals and analog and/or digital electronics operatively connected thereto. The RFID device may include passive RFID devices and/or active and/or semi-passive RFID devices including a battery and/or other power source. The electronics may be implemented via an integrated circuit (IC) and/or microchip and/or other suitable electronic circuit, such as, for example, communications electronics, data memory, control logic, etc.

The RFID device may operate in a variety of frequency ranges including, but not limited to, a low frequency (LF) range (e.g., from approximately 30 kHz to approximately 300 kHz), a high frequency (HF) and NFC (Near Field Communication) range (e.g., from approximately 3 MHz to approximately 30 MHz) and an ultra-high frequency (UHF) range (e.g., from approximately 300 MHz to approximately 3 GHz). A passive device may operate in any one of the aforementioned frequency ranges. Specifically, for passive devices, LF systems may operate at about 124 kHz, 125 kHz, or 135 kHz, HF and NFC systems may operate at about 13.56 MHz, and UHF systems may use a band from 860 MHz to 960 MHz. Alternatively, passive devices may use 2.45 GHz and/or other areas of the radio spectrum. Active RFID devices may operate at about 455 MHz, 2.45 GHz, or 5.8 GHz. Semi-passive RFID devices may operate at a frequency of about 2.4 GHz.

The read range of an RFID device (i.e., the range at which an RFID reader may communicate with the RFID device) may be determined by the type of device (e.g., active, passive, semipassive, etc.). Passive LF RFID devices (also referred to as LFID or LowFID devices) may typically be read from within approximately 12 inches (0.33 meters); passive HF RFID devices (also referred to as HFID or HighFID or NFC devices) may typically be read from up to approximately 3 feet (1 meter); and passive UHF RFID devices (also referred to as UHFID devices) may typically be read from approximately 10 feet (3.05 meters) or more.

One factor influencing the read range for passive RFID devices is the method used to transmit data from the device to the reader (e.g., the coupling mode between the device and the reader—which may be inductive coupling or radiative/propagation coupling). Passive LFID devices and passive HFTD devices may use inductive coupling between the device and the reader, whereas passive UHFID devices may use radiative or propagation coupling between the device and the reader.

Alternatively, in radiative or propagation coupling applications (e.g., as are conventionally used by passive UHFID devices), rather than forming an electromagnetic field between the respective antennas of the reader and device, the reader may emit electromagnetic energy that can illuminate the device. In turn, the device may gather the energy from the reader via an antenna, and the device's integrated circuit (IC) or microchip may use the gathered energy to change the load on the device antenna and reflect back an altered signal (e.g., backscatter). UHFID devices may communicate data in a variety of different ways such as increasing the amplitude of a reflected wave sent back to the reader (amplitude shift keying), shifting the reflected wave out of the phase of the received wave (phase shift keying), and/or changing the frequency of the reflected wave (frequency shift keying). The reader may then pick up the backscattered signal and convert the altered wave into data understood by the reader and/or an adjunct computer.

The antenna employed in the RFID device may be affected by numerous factors, such as intended application, type of device (e.g., active, passive, semi-active, etc.), desired read range, device-to-reader coupling mode, and/or frequency of operation of the device. For example, since passive LFID devices may normally be inductively coupled with the reader, and because the voltage induced in the device antenna may be proportional to the operating frequency of the device, passive LFID devices may include a coil antenna with many turns in order to produce enough voltage to operate the device IC and/or microchip. Comparatively, a conventional HFID passive device may include a planar spiral antenna (e.g., with 5 to 7 turns over a credit-card-sized form factor) to provide read ranges on the order of tens of centimeters. HFID antenna coils may be less costly to produce (e.g., compared to LFID antenna coils) since they may be made using techniques relatively less expensive than wire winding (e.g., lithography or the like). UHFID passive devices may be radiatively and/or propagationally coupled with the reader antenna and consequently may employ conventional dipole-like antennas. The RFID tag used with the present invention may utilize any of the aforementioned RFID devices, as well as others not specifically mentioned.

RFID tags may be advantageously attached to an innerliner of 11 a tire 10. The RFID tags may be received from suppliers on a roll with the RFID tags attached to a release liner with an uncured gum glue. The gum glue may have a good initial tack, or stickiness, to uncured rubber. However, after a curing/heating, the RFID tags may lose that initial tack and fall off of the innerliner 11. As shown in FIG. 1, a conventional roll 100 of example RFID tags 110 may include a radially outermost topcoat layer 111, a next radially inner first polyester layer 112 with a thermal printed barcode image (corona tested both sides), a next radially inner first high temperature adhesive layer 113, a next radially inner polyamide layer 114 with an etched antenna and IC, a next radially inner second high temperature adhesive layer 115, a next radially inner first adhesion promoter layer 116, a next radially inner second polyester layer 117, a next radially inner second adhesion promoter layer 118, a next radially inner uncured rubber-based third adhesive layer 119, and a removable liner 101 of the roll 100 for maintaining the RFID tags 110 prior to application to the innerliner 11, for example.

Figure 2:
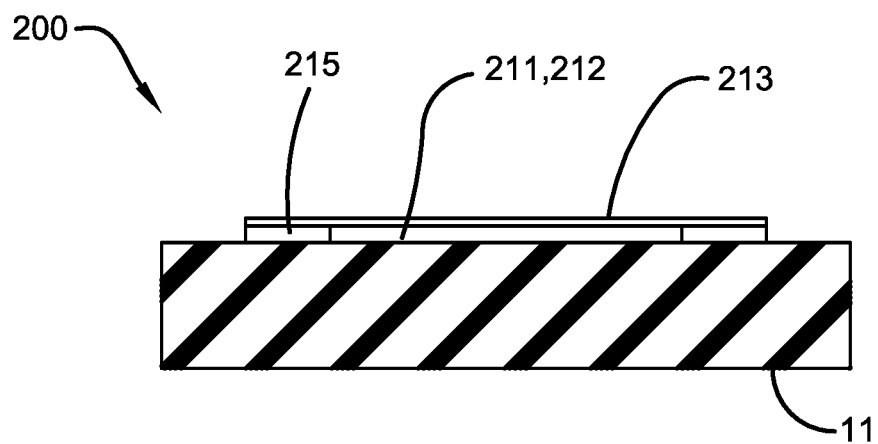
FIG. 2 is a schematic depiction of an attachment of an RFID tag in accordance with the present invention.
Figure 3:
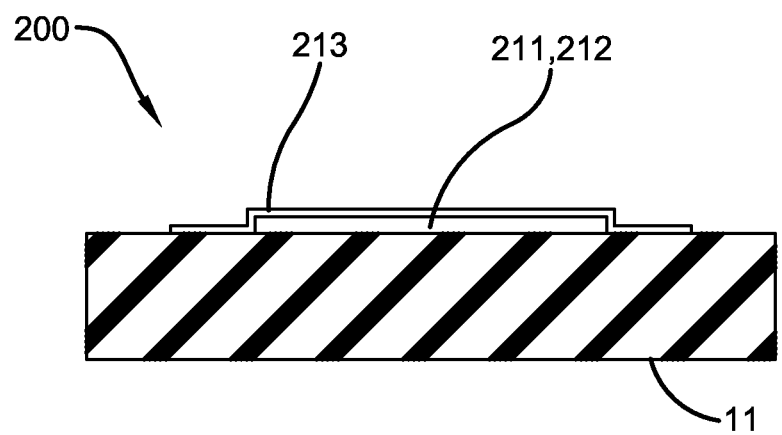
FIG. 3 is schematic depiction of another attachment of an RFID tag in accordance with the present invention.

As shown in FIGS. 2 & 3, a RFID tag 210 of a system 200 in accordance with the present invention may include only three layers: a first inward facing polyester layer 211, a next outer second polyester layer 212 with an etched antenna and an RFID chip, and an outermost third polyester layer 213. The three layers 211, 212, 213 may be secured to each other by any suitable glues and/or adhesion promoters. The first and second layers 211, 212 may provide structural integrity to the RFID tag 210, but provide no adhesion to an innerliner 11.

Instead of discarding a removable liner 101, the liner may be the third layer 213 itself and may be sized to appropriately surround the first and second layers 211, 212 and be temporarily secured to the innerliner 11 before curing of the tire 10. During curing, the liner 111 may at least partially liquify and permanently adhere to the innerliner 11 during cool down. Such a liner 213 may be constructed of any suitable polymeric material such an ultra-high molecular weight polyethylene (UHMWPE). The liner 213 may be sealed to the innerliner 11 completely around the first and second layers 211, 212 (FIG. 3) or left with an opening 215 (FIG. 2) to form a pocket for appropriate replacement/removal of the first and second layers 211, 212.

Variations of the present invention are possible in light of the description of it provided herein. While certain representative examples and details have been shown for the purpose of illustrating the present invention, it will be apparent to those skilled in this art that various changes and modifications may be made therein without departing from the scope of the present invention. It is, therefore, to be understood that changes may be made in the particular examples described herein which will be within the fully intended scope of the present invention as defined by the following appended claims.

What is claimed:

1. An RFID tag for attaching to a tire, the RFID tag consisting of:
   a first polyester layer;
   a second polyester layer adjacent the first polyester layer, the second polyester layer having an etched antenna and an RFID chip; and
   a third polyester layer adjacent the second polyester layer, the third polyester layer surrounding part of the first and second layers and being secured by heat to an innerliner of the tire.

2. The RFID tag as set forth in claim 1 wherein the second polyester layer includes a radially outermost topcoat sublayer.

3. The RFID tag as set forth in claim 1 wherein the second polyester layer is corona tested on both sides.

4. The RFID tag as set forth in claim 1 wherein the second polyester layer includes a radially inner polyamide sublayer with an etched antenna and an integrated circuit.

5. The RFID tag as set forth in claim 1 wherein the second polyester layer includes a radially inner first polyester sublayer with a thermal printed barcode image.

6. The RFID tag as set forth in claim 5 wherein the second polyester layer includes a radially inner second polyester sublayer.

7. The RFID tag as set forth in to claim 5 wherein the second polyester layer includes a radially inner uncured rubber-based third adhesive sublayer.

8. The RFID tag as set forth in claim 1 wherein the second polyester layer includes a radially inner first high temperature adhesive sublayer.

9. The RFID tag as set forth in claim 8 wherein the second polyester layer includes a radially inner second high temperature adhesive sublayer.

10. The RFID tag as set forth in claim 1 wherein the second polyester layer includes a radially inner first adhesion promoter sublayer.

11. The RFID tag as set forth in claim 10 wherein the second polyester layer includes a radially inner second adhesion promoter sublayer.

12. A tire comprising an RFID tag for attaching to the tire, the RFID tag consisting of:
    a first polyester layer;
    a second polyester layer adjacent the first polyester layer, the second polyester layer having an etched antenna and an RFID chip; and
    a third polyester layer adjacent the second polyester layer, the third polyester layer surrounding part of the first and second layers and being secured by heat to an innerliner of the tire.

13. The tire as set forth in claim 12 wherein the second polyester layer includes an ultra-high molecular weight polyethylene (UHMWPE).

* * * * *